(12) United States Patent
Shekhar Rao Tumula et al.

(10) Patent No.: US 9,240,977 B2
(45) Date of Patent: Jan. 19, 2016

(54) TECHNIQUES FOR PROTECTING MOBILE APPLICATIONS

(71) Applicant: Novell, Inc., Provo, UT (US)

(72) Inventors: Chandra Shekhar Rao Tumula, andhra pradesh (IN); Lloyd Leon Burch, Payson, UT (US)

(73) Assignee: NetIQ Corporation, Provo, UT (US)

( * ) Notice: Subject to any disclaimer, the term of this patent is extended or adjusted under 35 U.S.C. 154(b) by 57 days.

(21) Appl. No.: 13/938,681

(22) Filed: Jul. 10, 2013

(65) Prior Publication Data

US 2014/0020062 A1 Jan. 16, 2014

Related U.S. Application Data

(60) Provisional application No. 61/670,516, filed on Jul. 11, 2012.

(51) Int. Cl.
*G06F 7/04* (2006.01)
*H04L 29/06* (2006.01)
*H04W 12/08* (2009.01)

(52) U.S. Cl.
CPC ............... *H04L 63/04* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 8,233,882 B2 | 7/2012 | Rogel | |
| 8,578,443 B2* | 11/2013 | Narain et al. | 726/1 |
| 2010/0022231 A1* | 1/2010 | Heins et al. | 455/418 |
| 2010/0330961 A1 | 12/2010 | Rogel | |
| 2012/0084836 A1 | 4/2012 | Mahaffey et al. | |
| 2012/0229499 A1* | 9/2012 | Tsao et al. | 345/619 |
| 2012/0240183 A1* | 9/2012 | Sinha | 726/1 |
| 2013/0014248 A1 | 1/2013 | McLaughlin et al. | |
| 2013/0130649 A1 | 5/2013 | Mahaffey et al. | |
| 2014/0007222 A1* | 1/2014 | Qureshi et al. | 726/16 |
| 2014/0032691 A1* | 1/2014 | Barton et al. | 709/206 |

* cited by examiner

*Primary Examiner* — Kaveh Abrishamkar
(74) *Attorney, Agent, or Firm* — Schwegman Lundberg & Woessner, P.A.

(57) ABSTRACT

Techniques for protecting mobile applications are presented. A user's mobile device is provisioned and proxied over a cloud environment with enterprise policy enforced in that cloud environment. Enterprise applications run on the mobile device within the cloud environment. Administrative reporting and control occurs within the cloud environment and the enterprise applications establish connections to, authenticate to, and communicate with remote enterprise services via the provisioned cloud environment.

18 Claims, 6 Drawing Sheets

TECHNIQUES FOR PROTECTING MOBILE APPLICATIONS

RELATED APPLICATIONS

The present application is a non-provisional filing of, and claims priority to Provisional Application No. 61/670,516 filed on Jul. 11, 2012; entitled: "Techniques for Protecting Mobile Applications," the disclosure of which is incorporated by reference herein in its entirety.

BACKGROUND

As mobile devices are being used as a basic part of the corporate Information Technology (IT) solutions, security is suffering. One of the reasons that security is such a problem is because the corporate IT department has little or no control of the mobile device. The company cannot control: what other applications may be running on the mobile device, the environment of the mobile device, and potential theft of the device; such circumstances expose the security of network data that the user's mobile device has legitimate access to.

Making the problem harder to solve, most of the time the mobile device is not actually owned by the company, but is owned and controlled by the employee of the company. This is called the "Bring Your Own Device" (BYOD) model and is becoming a new standard for mobile devices. Today, BYOD situations are most prevalent with the tablet style iPad® devices and exasperates device management, which can be done by the company. So, the user is the owner of the device; and the user typically only authorizes control by the company to company-based applications or data, but the user does allow the company any other control or access to the user's mobile device.

The situation becomes a catch-22 situation because the company is the owner of the data and therefore does not want its data used on an insecure platform or device, which the company cannot control. This creates a "mobile standoff," which limits how mobile devices are used within the company and results in corporate modifications to the employee policy manual defining "corporate acceptable" usage of mobile devices in the corporations attempt to control behavior of employees in order to give the corporate some sense of control over the security hole created when mobile devices of employees are given access to potentially sensitive corporate data.

SUMMARY

Various embodiments of the invention provide techniques for protecting mobile applications. Specifically and in one embodiment, a mobile application agent is registered over a network to interact with remote enterprise services that are accessed over the network from a mobile device using a remote mobile application that interacts with the mobile application agent. Next, a secure connection is established with the remote mobile application and the secure connection is used for accessing features of the remote mobile application, via user interaction with the mobile application agent.

DETAILED DESCRIPTION

Various components are shown herein and below, each of these components are implemented on and/or reside within a non-transitory computer-readable storage medium as executable instructions, which are executed by a processing device having one or more processors and memory. The processors are specifically configured and programmed to process the executable instructions from the non-transitory storage medium and/or from the memory. The components also have access to a network and the network may be wired, wireless, or a combination of wired and wireless.

A "mobile device" is a device having one or more processors, memory, and/or non-transitory computer-readable storage. Some example mobile devices include, by way of example only: a phone, a laptop, a tablet, a wearable processing device, and the like.

The embodiments herein take a different approach to solving the problem associated with granting network access to remote data or resources from a user-owned and controlled mobile device. The embodiments herein do not try to build a safe processing environment on the mobile device by encrypting the data used by the device, or by sandboxing the application on the device.

Rather, the novel approaches herein build a new processing environment for the user-controlled and owned mobile device applications in a "trusted" server space, which is under the complete control of the company not the user.

This is achieved by using a device emulator running on a server machine as a Virtual Machine (VM). In fact, most mobile devices already have an emulation program environment that can run on platforms other than the native device platform or the mobile device. The emulation program environment is often used for: testing, presentations, or development. However, here any such emulation program environment is used to access corporate or enterprise mobile apps from a server and/or cloud environment using a user's mobile device as a form of a thin client.

The techniques herein extend a mobile device's native emulation environment by separating the input and output from the emulation environment and then using the mobile device as the output screen in place of the emulation screen and using mobile input from the mobile device as input for the emulation environment. Input is not limited to a keyboard and can include many of the mobile device's existing input controls such as: Global Positioning Satellite (GPS), motion, camera, voice and others. The output of the emulation can also use the full output of the mobile device such as: sound, screen, vibration, and other output media.

Figure 1:
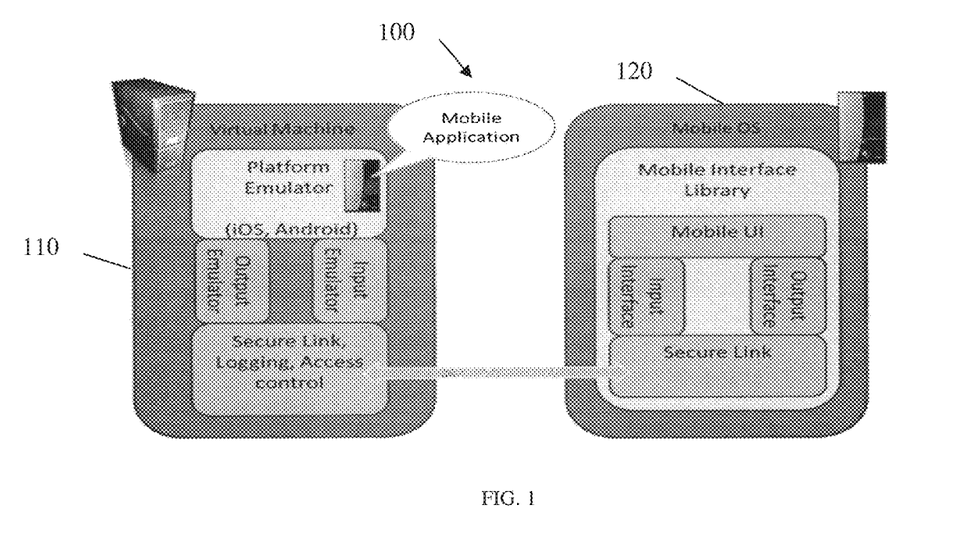
FIG. 1 is a diagram depicting an example architecture of components used for protecting mobile applications, according to the techniques presented herein.

FIG. 1A is a diagram depicting an example architecture 100 of components used for protecting mobile applications, according to the techniques presented herein.

The architecture 100 includes a Virtual Machine (VM), which includes: a platform emulator to remotely run an enterprise mobile application from the VM on behalf of a mobile device, an output emulator, an input emulator, and a secure access link over a network connection to the user's mobile device.

The architecture also includes a mobile device having a mobile Operating System (OS), a mobile interface library, and a mobile user interface. The mobile user interface (UI) acts as a thin client on the mobile device to access the secure link and process the enterprise or corporate mobile app remotely on the server using the VM.

Figure 2A:
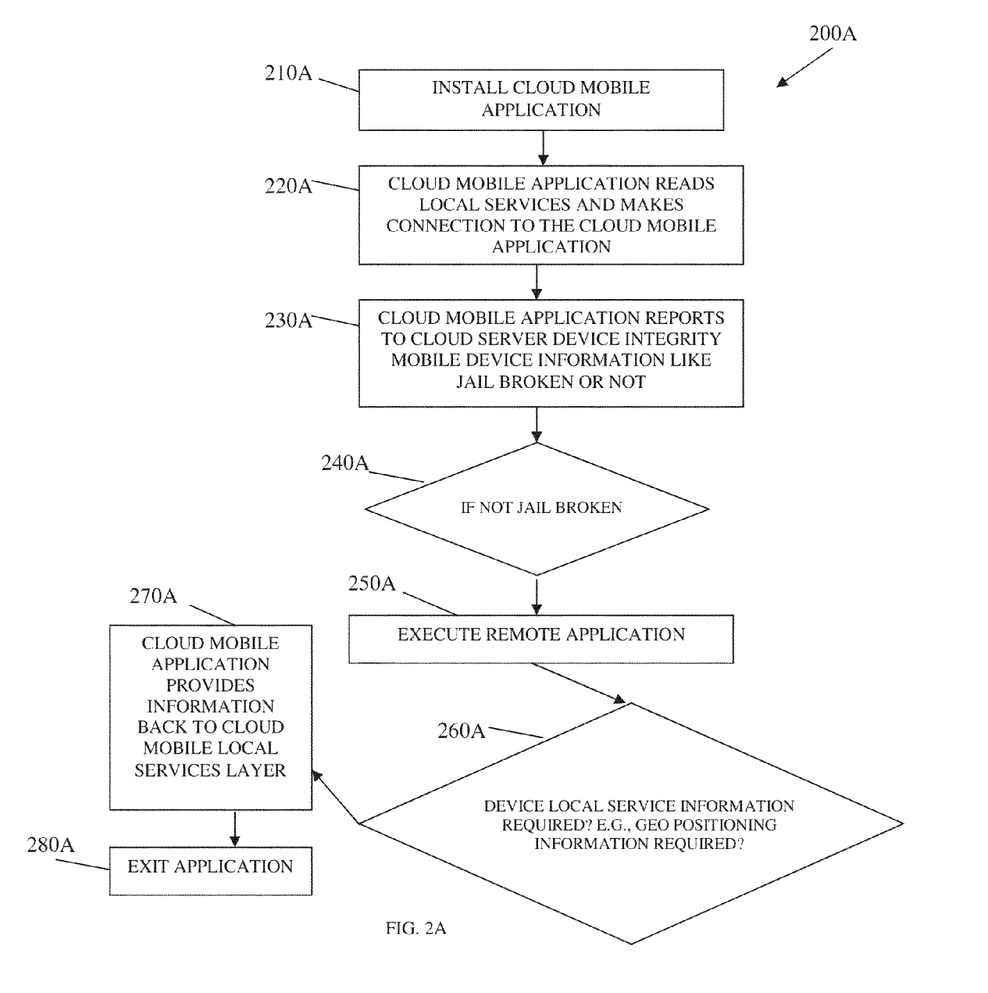
FIG. 2A is a diagram of a method for protecting mobile applications from a user access processing perspective, according to embodiments presented herein.

FIG. 2A is a diagram of a method 200 for protecting mobile applications from a user access processing perspective, according to embodiments presented herein. The method 200 is implemented as instructions that are programed within memory of a mobile device of a user or that are programmed and available from a non-transitory computer readable storage medium.

At 210A, the cloud mobile application is installed and initiated on a user's mobile device (laptop, phone, wearable device, etc.). At this point in time the cloud mobile application performs some discovery work for the VM server that actually runs a secure version of an enterprise application for an enterprise.

At 220A, the cloud mobile application reads local services available on the mobile device and makes a connection to the VM/Server cloud mobile application from the mobile device. Once the connection is established, the user's mobile device acts as a thin client and the actual mobile application remains under the control of the enterprise from the remote networked server/cloud/VM.

At 230A, the cloud mobile application reports to the cloud server device on the integrity discovered for the mobile device, such as is the mobile device insecure and jail broken and other metrics can be configured to be discovered and reported as well.

In an example case, at 240A, a check is made to ensure that the mobile device is not in fact jail broken. If the mobile device is jail broken then processing can stop and/or warning messages can be issued to the user to repair the device to a version of the OS that is not jail broken.

Assuming that the mobile device is not jail broken, at 250A, the remote cloud mobile application is executed on behalf of the user and the mobile device from the server/cloud/VM, which remains under the control of the enterprise to which the mobile cloud application is associated.

In an embodiment, at 260A, a check is made to determine what type of information the remote mobile cloud application needs from the thin client cloud mobile application (mobile device agent). Some information that the agent can report can include service information, geographic position of the device, and the like.

At 270A, the agent cloud mobile application from the mobile device provides the information back to the cloud mobile local services layer (the information gathered in 260A).

At this point, the information is used and interactions occur between the agent application and the remote application so as to provide services to the user via the mobile device of the user. Eventually, the cloud mobile application agent on the mobile device is exited or terminated normally by the user, at 280A.

Figure 2B:
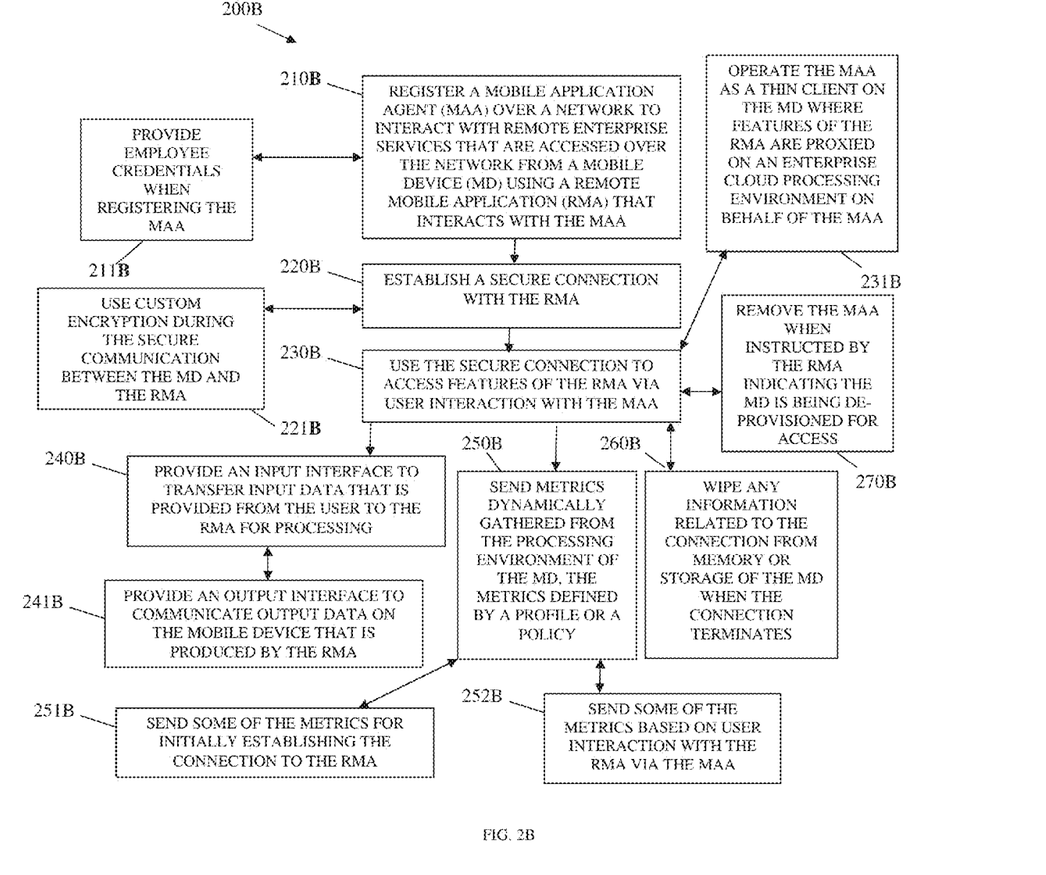
FIG. 2B is a diagram of another method for protecting applications from a user access processing perspective, according to embodiments presented herein.

FIG. 2B is a diagram of another method 200B for protecting applications from a user access processing perspective, according to embodiments presented herein. The method 200B (herein after referred to as "mobile application agent") is programmed as executable instructions within memory or a non-transitory computer-readable storage medium for execution on one or more processors of a network. The network can be wired, wireless, or a combination of wired and wireless.

The method 200B provides another and in some ways enhanced perspective of the method 200A, which executes on a user's mobile device (laptop, phone, tablet, wearable device, and the like).

At 210B, the mobile application agent registers a mobile application agent over a network to interact with remote enterprise services that are accessed over the network from the user's mobile device using a remote mobile application that interacts with the mobile application agent. The mobile application agent acts as a thin client on the mobile device and the enterprise's mobile application is proxied on a remote server or cloud processing environment on behalf of the user via interactions with the mobile application agent.

According to an embodiment, at 211B, the mobile application agent provides employee credentials when registering the mobile application agent. The employee credentials can be interactively provided by the user of the mobile device or can be encrypted and stored and accessible to the mobile application agent to automatically provide on behalf of the user once the user provides a different form or authentication, such as a password.

At 220B, the mobile application agent establishes a secure connection with the remote mobile application. That is, a secure connection either via a secure protocol or via an insecure protocol using encryption is established between the mobile application agent and the remote mobile application.

In an embodiment, at 221B, the mobile application agent uses custom encryption during the secure communication between the mobile device and the remote mobile application. So, custom encryption can be used to customize the secure connection between the mobile application agent of the mobile device and the remote mobile application being proxied from a server/VM/cloud environment on behalf of an enterprise.

At 230B, the mobile application agent uses the secure connection to access features of the remote mobile application via user interaction with the mobile application agent. So, an enterprises mobile application (remote mobile application) is proxied and executed in a remote environment that is entirely separate from the user's mobile device. This allows the enterprise to continue to maintain control of the mobile application and enforce security while permitting a user to use his/her own device to access the mobile application via the mobile application agent.

According to an embodiment, at 231B, the mobile application agent operates the mobile application agent as a thin client on the mobile device where features of the remote mobile application are proxied on an enterprise cloud processing environment on behalf of the mobile application agent.

In an embodiment, at 240B, the mobile application agent provides an input interface to transfer input date that is provided from the user to the remote mobile application for processing.

Continuing with the embodiment of 240B and at 241B, the mobile application agent provides an output interface to communicate output data on the mobile device that is produced by the remote mobile application.

In one scenario, at 250B, the mobile application agent sends metrics dynamically gathered from the processing environment of the mobile device. The metrics defined by a profile or a policy.

Continuing with the embodiment of 250B and at 251B, the mobile application agent sends some of the metrics for initially establishing the connection to the remote mobile application.

In another case of the embodiment of 250B and at 252B, the mobile application agent sends some of the metrics based on user interaction with the remote mobile application via the mobile application agent.

According to an embodiment, at 260B, the mobile application agent wipes any information related to the connection from memory or storage of the mobile device when the connection terminates.

In still another situation, at 270B, the mobile application agent removes the mobile application agent when instructed by the remote mobile application indicating the mobile device is being de-provisioned for access. This can occur for a variety of reasons such as employee termination, acting outside the scope of security polices, and the like.

Figure 3A:
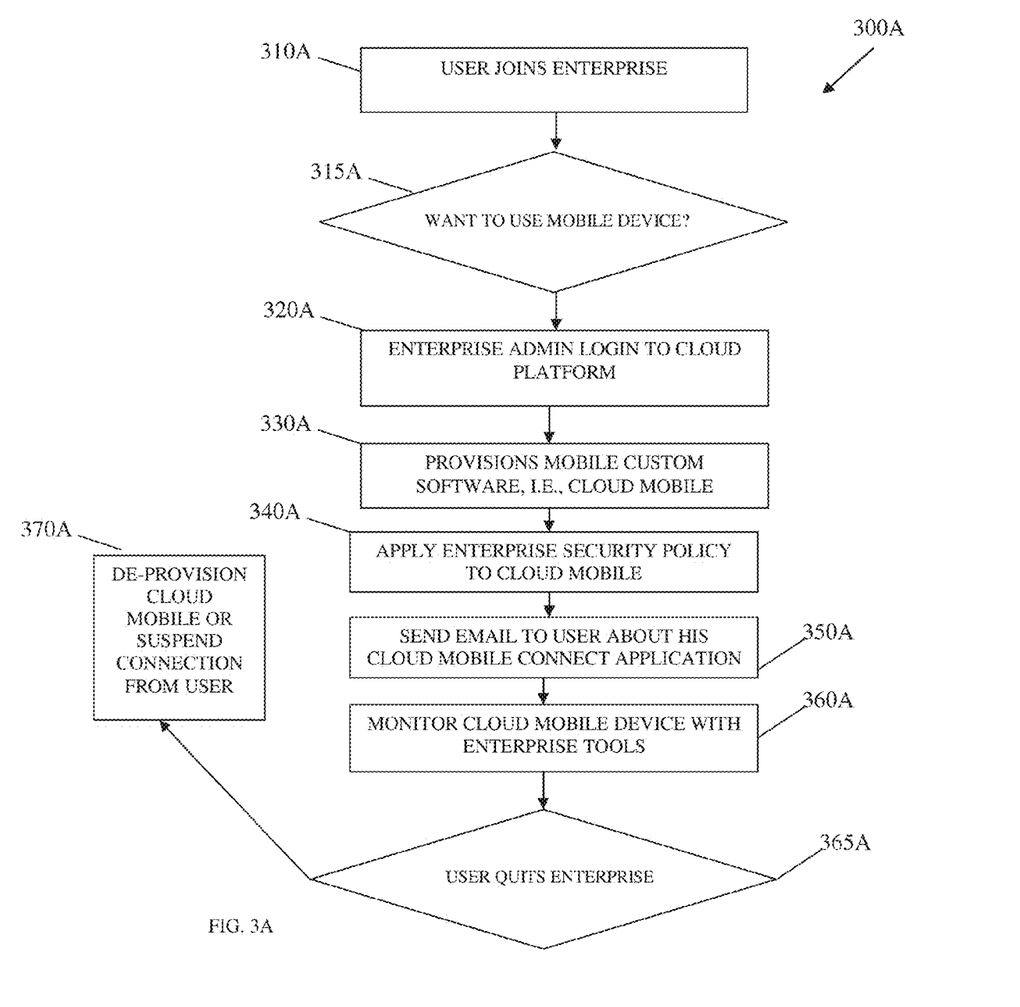
FIG. 3A is a diagram of another method for protecting mobile applications from an enterprise or corporate processing perspective, according to embodiments presented herein.

FIG. 3A is a diagram of another method 300A for protecting mobile applications from an enterprise or corporate processing perspective, according to embodiments presented herein. The method 300A is programmed as executable instruction within memory and/or a non-transitory computer-readable storage medium for execution on one or more processors of a server or cloud processing environment (collections of servers).

At 310A, a detection is made that a user is joining an enterprise and at 315A a check is made to determine that the user wants to register and use a mobile device that belongs to that user (tablet, laptop, phone, wearable device, and the like). It is assumed that the user wants to register and use the mobile device in the illustration of the FIG. 3A.

At 320A, an enterprise administrator logs into the cloud platform that processes the method 300A.

At 330A, mobile custom software for the cloud mobile application is provisioned.

At 340A, enterprise security policy is applied to the instance of the cloud mobile application that was provisioned in the cloud for use by the mobile device.

In an embodiment, at 350A, an email is sent to the user regarding the user's cloud mobile connect application. So, details on the mobile device's agent is sent to the user, the agent runs on the mobile device and interacts with the remote cloud mobile application, which remains under the control of the enterprise to which it is distributed.

At 360A, the mobile device's actions are monitored and can be adjusted using enterprise tools on the server/VM/cloud that is remote from the mobile device.

In some situations, at 365A, the user may quit the enterprise, in which case, at 370, the server/VM/cloud mobile application available to the user via the agent on the mobile device is de-provisioned and any then-existing connection between the remote mobile application and the mobile device agent can be suspended.

Figure 3B:
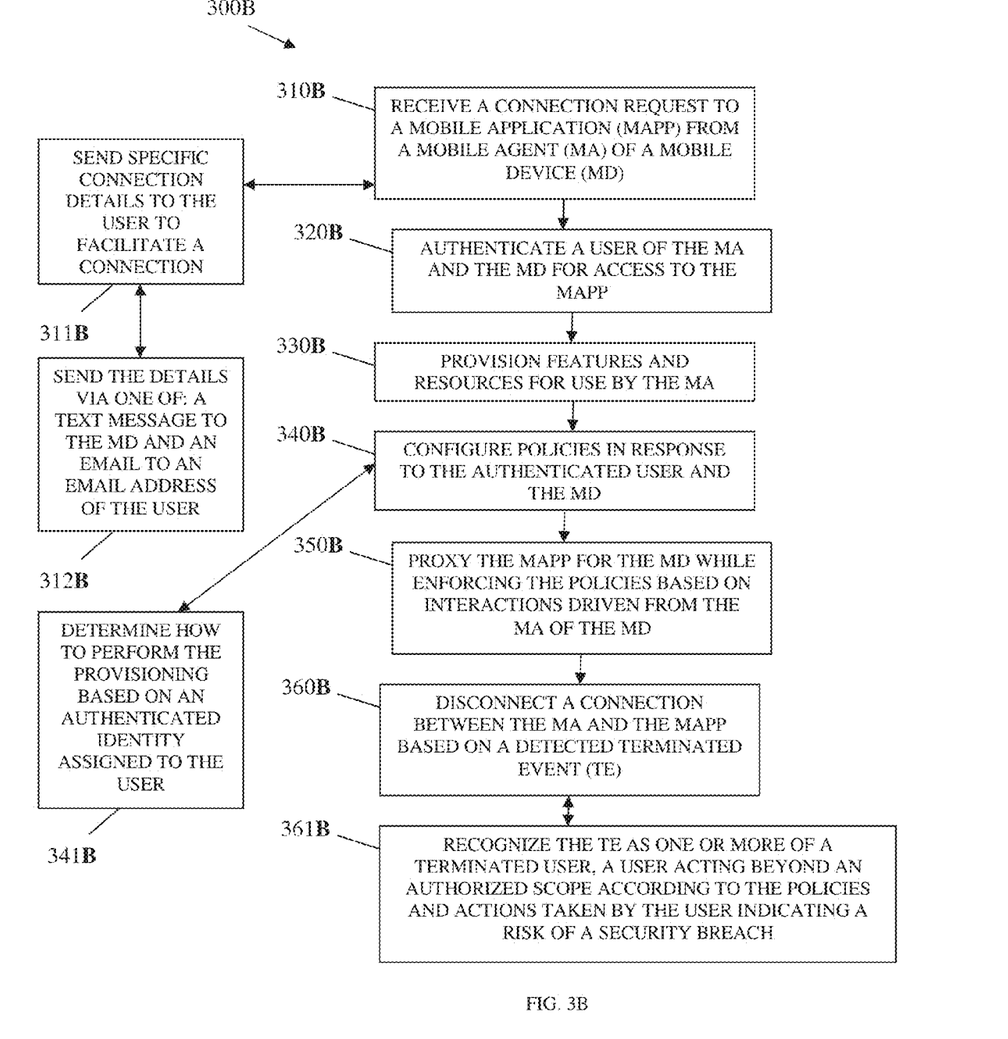
FIG. 3B is a diagram of still another method for protecting mobile applications from an enterprise or corporate processing perspective, according to embodiments presented herein.

FIG. 3B is a diagram of still another method 300B for protecting mobile applications from an enterprise or corporate processing perspective, according to embodiments presented herein. The method 300B (hereinafter referred to as "cloud application") is programmed as executable instructions within memory of a non-transitory computer-readable storage medium for execution on one or more processors of a server/VM/cloud environment.

The cloud application presents another and in some ways enhanced perspective of the method 300A.

At 310B, the cloud application receives a connection request to a mobile application from a mobile agent of a mobile device.

According to an embodiment, at 311B, the cloud application sends specific connection details to the user to facilitate a connection.

Continuing with the embodiment of 311B and at 312B, the cloud application sends the details via one of: a text message to the mobile device and an email to an email address of the user.

At 320B, the cloud application authenticates the user of the mobile agent and the mobile device for access to the mobile application.

At 330B, the cloud application provisions features and resources for use by the mobile agent.

At 340B, the cloud application configures policies in response to the authenticated user and the mobile device.

According to an embodiment, at 341B, the cloud application determines how to perform the provisioning based on an authenticated identity assigned to the user.

At 350B, the cloud application proxies the mobile application for the mobile device while enforcing policies based on interactions driven from the mobile agent of the mobile device.

In an embodiment, at 360B, the cloud application disconnects a connection between the mobile agent and the mobile application based on a detected terminated event.

Continuing with the embodiment of 360B and at 361B, the cloud application recognizes the terminated event as one or more of: a terminated user, a user acting beyond an authorized scope according to the policies, and actions taken by the user indicating a risk of a security breach.

Figure 4:
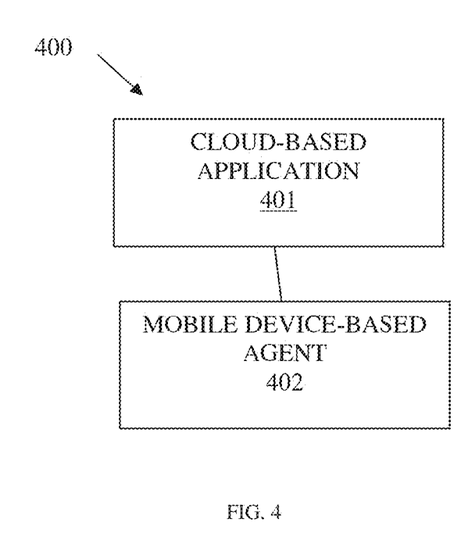
FIG. 4 is a diagram of a mobile application access system, according to embodiments presented herein.

FIG. 4 is a diagram of a mobile application access system 400, according to embodiments presented herein. The mobile application access system 400 includes a variety of components each of which are implemented as executable instructions within memory or a non-transitory computer-readable storage medium for execution on processors of multiple devices.

The mobile application access system 400 implements, inter alia, the methods 200A, 200B, 300A, and 300B.

The mobile application access system 400 includes a cloud-based application 401 and a mobile device-based agent 402.

The mobile application access system 400 includes a first server or first cloud processing environment having memory programmed with the cloud-based application 401. Example processing associated with the cloud-based application 401 was presented above with respect to the methods 300A and 300B of the FIGS. 3A and 3B, respectively.

The cloud-based application 401 is configured to be proxied from the first machine on behalf of a user of the second machine based on direction supplied via the mobile device-based agent 402.

According to an embodiment, the first machine is one of: a VM on a server, the server, and a cloud processing environment.

The mobile application access system 400 includes a mobile device of a user having memory programmed with the mobile device-based agent 402. Example processing associated with the mobile device-based agent 402 was presented above with respect to the methods 200A and 200B of the FIGS. 2A and 2B, respectively.

The mobile device-based agent 402 is configured to interact with the cloud-based application 401 to act as a thin client on the second machine on behalf of the user.

According to an embodiment, the second machine is one of: a phone, a tablet, a laptop, and a wearable processing device.

The techniques taught herein and above provide a variety of novel benefits for example:

1) personal applications and enterprise applications are not mixed up;
2) enterprises are not required to manage the end user's device, so the user has more privacy in using his/her own device for other purpose;
3) managing cloud mobile is efficient and easy, the enterprise has to deal with cloud infrastructure anyway, so there is more control of enterprise applications and enterprise data;
4) cloud mobile can be accessed from any device, so there is more flexibility in using it, for instance the user can access from a mobile device or a tablet or from a desktop browser, switching between devices is simple and one can share session data between devices;
5) cloud mobile can be configured according to an enterprise compliance policy without compromise and at the same time giving more freedom to a user's personal device; and
6) more security in accessing network enterprise information with no worries should a user's mobile device be lost since no enterprise information is stored on that personal device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method programmed within memory or a non-transitory machine-readable storage medium and processed by one or more processors of a mobile device that is configured to perform the method, comprising:
   registering, via the mobile device, a mobile application agent over a network to interact with remote enterprise services that are accessed over the network from the mobile device using a remote mobile application that interacts with the mobile application agent, the remote enterprises server executing on a server over the network as a virtual machine that emulates a platform of the mobile device and other platforms of other devices;
   establishing, via the mobile device, a secure connection with the remote mobile application; and
   using, via the mobile device, the secure connection to access features of the remote mobile application via user interaction with the mobile application agent and operating the mobile device as a thin client during the user interaction with the mobile application agent remaining under control of the remote mobile application during the user interaction.

2. The method of claim 1 further comprising, providing, on the mobile device and via the mobile application agent, an input interface to transfer input data that is provided from the user to the remote mobile application for processing.

3. The method of claim 2 further comprising, providing, on the mobile device and via the mobile application agent, an output interface to communicate output data on the mobile device that is produced by the remote mobile application.

4. The method of claim 1 further comprising, sending, from the mobile device, metrics dynamically gathered from the processing environment of the mobile device, the metrics defined by a profile or a policy.

5. The method of claim 4, wherein sending further includes sending some of the metrics for initially establishing the connection to the remote mobile application.

6. The method of claim 4, wherein sending includes sending some of the metrics based on user interaction with the remote mobile application via the mobile application agent.

7. The method of claim 1 further comprising, wiping, via the mobile device, any information related to the connection from memory or storage of the mobile device when the connection terminates.

8. The method of claim 1 further comprising, removing, via the mobile device, the mobile application agent when instructed by the remote mobile application indicating the mobile device is being de-provisioned for access.

9. The method of claim 1, wherein registering further includes providing employee credentials when registering the mobile application agent.

10. The method of claim 1, wherein establishing further includes using custom encryption during the secure communication between the mobile device and the remote mobile application.

11. A method programmed within memory or a non-transitory machine-readable storage medium and processed by one or more processors of a server machine that is configured to perform the method, comprising:
    receiving, at the server machine, a connection request to a mobile application from a mobile agent of a mobile device, wherein the server machine is a virtual machine on a server that emulates a platform of the mobile device and other platforms of other devices;
    authenticating, at the server machine, a user of the mobile agent and the mobile device for access to the mobile application;
    provisioning, at the server machine, features and resources for use by the mobile agent;
    configuring, at the server machine, policies in response to the authenticated user and the mobile device; and
    proxying, from the server machine, the mobile application for the mobile device while enforcing the policies based on interactions driven from the mobile agent of the mobile device, and operating the mobile device as thin client during the interactions by maintaining control over the mobile agent during the interactions.

12. The method of claim 11 further comprising, disconnecting, via the server machine, a connection between the mobile agent and the mobile application based on a detected terminating event.

13. The method of claim 12, wherein disconnecting further includes recognizing the terminating event as one or more of a terminated user, a user acting beyond an authorized scope according to the policies, and actions taken by the user indicating a risk of a security breach.

14. The method of claim 11, wherein receiving further includes sending specific connection details to the user to facilitate a connection.

15. The method of claim 14, wherein sending further includes sending the details via one of: a text message to the mobile device and an email to an email address of the user.

16. The method of claim 11, wherein configuring further includes determining how to perform the provisioning based on an authenticated identity assigned to the user.

17. A system, comprising:
    a first machine having memory programmed with a cloud-based application that executes on one or more processors of the first machine; and
    a second machine having memory programmed with a mobile device-based agent that executes on one or more processors of the second machine;
    wherein the cloud-based application is configured to be proxied from the first machine on behalf of a user of the second machine based on direction supplied via the mobile device-based agent, and wherein the first machine is a virtual machine executing on a server and the first machine configured to emulate a platform of the second machine and other platforms of other machines, and wherein the second machine operated as a thin client during interactions between the cloud-based application and the mobile device-based agent of the second machine and the cloud-based application maintains control over the mobile device-based agent during those interactions.

18. The system of claim 17, wherein the second machine is one of: a phone, a tablet, a laptop, and a wearable processing device.

* * * * *